(12) United States Patent
Cummings et al.

(10) Patent No.: US 12,146,303 B2
(45) Date of Patent: Nov. 19, 2024

(54) WATER FLOW MANAGEMENT SYSTEM AND METHOD FOR URINAL

(71) Applicants: Caroma Industries Limited, North Sydney (AU); micas AG, Oelsnitz (DE)

(72) Inventors: Steve Cummings, New South Wales (AU); Michael Fritzsche, Neukirchen/Erzgebirge (DE); Mark Ebert, Oelsnitz/Erzgebirge (DE); Dragan Music, New South Wales (AU)

(73) Assignees: Caroma Industries Limited, North Sydney (AU); micas AG, Oelsnitz (DE)

( * ) Notice: Subject to any disclaimer, the term of this patent is extended or adjusted under 35 U.S.C. 154(b) by 834 days.

(21) Appl. No.: 17/257,840

(22) PCT Filed: Jul. 10, 2019

(86) PCT No.: PCT/AU2019/050723
§ 371 (c)(1),
(2) Date: Jan. 4, 2021

(87) PCT Pub. No.: WO2020/010396
PCT Pub. Date: Jan. 16, 2020

(65) Prior Publication Data
US 2021/0293004 A1    Sep. 23, 2021

(30) Foreign Application Priority Data

Jul. 11, 2018 (AU) ................................ 2018902514

(51) Int. Cl.
*G05D 7/06* (2006.01)
*E03B 7/07* (2006.01)
(Continued)

(52) U.S. Cl.
CPC .............. *E03B 7/075* (2013.01); *E03B 7/071* (2013.01); *G05B 19/042* (2013.01);
(Continued)

(58) Field of Classification Search
None
See application file for complete search history.

(56) References Cited

U.S. PATENT DOCUMENTS 5,853,130 A * 12/1998 Ellsworth ............. B05B 12/122
239/69
10,558,228 B1 * 2/2020 Chavez ................. G01F 15/066
(Continued)

FOREIGN PATENT DOCUMENTS

AU         2008200881 B1 *  7/2009  ............. E03D 1/003

OTHER PUBLICATIONS

'Cube 0.8L Electronic Series II Electronic Activation Urinal Suite Installation Instructions' Caroma, published Feb. 10, 2015.*

*Primary Examiner* — Bernard G Lindsay
(74) *Attorney, Agent, or Firm* — Seed IP Law Group LLP (57) ABSTRACT

A water flow management system (1) is disclosed including a valve (22), the valve (22) being adapted to communicate with at least one water flow detector (24) and a set of water usage products (40), wherein the water flow detector (24) is for detecting water flow to the set of water usage products (40). The valve includes a processor (205) that is arranged to determine: an operational status of the set of water usage products (40), a water flow status of the water flow detector (24), and whether, on the basis of the operational status and the water flow status, the water flow to the set of water usage products (40) requires alteration. The processor (205) is adapted to operate the valve (40) to effect the required alteration.

28 Claims, 4 Drawing Sheets

(51) Int. Cl.
    *G05B 19/042*      (2006.01)
    *G08B 21/18*       (2006.01)

(52) U.S. Cl.
    CPC ......... *G05D 7/0623* (2013.01); *G05D 7/0635* (2013.01); *G08B 21/18* (2013.01); *G05B 2219/25312* (2013.01); *G08C 2200/00* (2013.01); *G08C 2201/51* (2013.01)

(56) References Cited

U.S. PATENT DOCUMENTS

| | | |
|---|---|---|
| 2004/0206405 A1 | 10/2004 | Smith et al. |
| 2005/0171709 A1 | 8/2005 | Nortier et al. |
| 2005/0249606 A1* | 11/2005 | Rush ............... G01F 1/708 417/322 |
| 2010/0212748 A1 | 8/2010 | Davidoff |
| 2014/0076415 A1 | 3/2014 | Dunki-Jacobs et al. |
| 2015/0160663 A1* | 6/2015 | McCarthy, III .... H04N 21/6143 700/283 |
| 2016/0077530 A1* | 3/2016 | Moran ................. E03C 1/0408 700/282 |
| 2016/0161940 A1 | 6/2016 | Max |
| 2017/0030528 A1 | 2/2017 | Dietzen et al. |
| 2018/0143056 A1 | 5/2018 | Gal |
| 2021/0164860 A1* | 6/2021 | Young .................... E03B 7/071 |
| 2021/0278006 A1* | 9/2021 | McConnell ............. G01M 3/28 |

\* cited by examiner

WATER FLOW MANAGEMENT SYSTEM AND METHOD FOR URINAL

FIELD

This invention relates to a water flow management system.

BACKGROUND

In general, water usage products are products that are used with water and that can control at least one operational parameter associated with the water such as, for example, temperature, flow rate, pressure etc. Water usage products may be connected to a water source to enable those products to function as designed. These water usage products may be, for example, "end of line" plumbing fixtures such as tap ware, urinals, cisterns, showers, toilets and "inline" plumbing fixtures such as, for example, flow control valves, thermostatic mixing valves (TMV) and water re-circulation pumps.

For example, water usage products may be used in one or more environments or areas such as kitchens, bathrooms, restrooms, toilets and the like. For example, these water usage products may be bathroom or kitchen products and the like including urinals, basins, shower heads, taps and toilets, for example. As a further example, water usage products may be plumbing fixtures and the like. As yet a further example, water usage products may be other types of devices in which water is used such as water reticulation systems, water storage units, water sprinklers, hoses and outdoor taps.

Water usage products may be installed in bathroom facilities in various areas where excessive water usage is of concern and so its supply may be limited. To assist with this, low water usage type products may be used. However, in situations where a water usage product, or piping relating to the water usage product, may have a fault, such as a leak, large quantities of water may be wasted before such a leak is detected and rectified. In addition to the waste of water, the damage to facilities increases the longer a leak is undetected and unattended to.

In medium to large buildings, multiple bathroom facilities usually exist. Monitoring and control of the water used by the numerous water usage products in each of the bathroom facilities may be problematic and time consuming as it becomes necessary for individuals to move from facility to facility and device to device to assess any problems and monitor the water usage products. This problem is further exacerbated when a building manager is in charge of multiple buildings.

While some products are known that can determine "abnormal" water usage behaviour and instigate a shut off of water flow, the definition and determination of "abnormal" behaviour can lead to a poor confidence in the decisions made by the known products. For example, some devices might consider a large amount of water being used for a bath at night to be unusual and trigger a shut-off, when the usage was intended by the user. Thus, a problem with known devices is that they cannot differentiate between unusual and unintended usage of water usage products.

Monitoring numerous water usage products on a building scale may also preclude the ability to manage the water usage products on an individual basis. For example, urinals require a minimum flow rate of about 18 L min$^{-1}$ to ensure that waste is flushed through an S-bend included in most commercially available urinals. If the water flow rate is lower than the minimum flow rate, urine salts would form and build up in the S-bend, decreasing performance of the urinal, or ultimately leading to blockages.

Similarly, the water flow rate to a shower head is typically limited using a water flow rate restrictor to limit the water flow rate through the shower head to comply with water use reduction regulations. However, the indiscriminate reduction of flow rate may lead to lower than necessary water pressure, or indeed lower than necessary water flow rate at the shower head.

SUMMARY OF INVENTION

It is an object of the present invention to at least substantially overcome one or more of the above disadvantages, or at least provide a useful alternative to the above described arrangements.

In a first aspect the present invention provides a valve assembly adapted to communicate with at least one water flow detector and a set of water usage products,
    wherein the water flow detector is for detecting water flow to the set of water usage products,
    wherein the valve assembly includes a processor that is arranged to determine:
        an operational status of the set of water usage products,
        a water flow status of the water flow detector, and
        whether, on the basis of the operational status and the water flow status, the water flow to the set of water usage products requires alteration,
    wherein the processor is adapted to operate the valve assembly to effect the required alteration.

Preferably, the alteration is a stop of the water flow in response to a leak occurring, wherein the processor determines whether a water leak is occurring, based upon a determination that the water flow status indicates a water flow through the water flow detector and the operational status indicates that water is not currently being used by the set of water usage products.

Preferably, the alteration is an increase in the pressure of the water flow to the set of water usage products.

Preferably, the alteration is a decrease in the pressure of the water flow to the set of water usage products Preferably, the alteration is a control of the water flow to the set of water usage to a predetermined water flow rate.

Preferably, the predetermined water flow rate is a minimum flow rate to a urinal.

Preferably, the predetermined water flow rate is a maximum flow rate to a shower Preferably, the valve assembly includes a communication module adapted to communicate with the processor and a user device, such that the processor is able to send a performance signal confirming a performance of the set of water usage products to a user device.

Preferably, the performance signal is an alarm signal based on the operational status and the water flow status.

Preferably, the performance signal includes a confirmation that a water usage product is correctly installed.

Preferably, the water flow detector is a component of the valve assembly.

Preferably, the water flow detector is a water flow smart meter.

Preferably, the set of water usage products comprise at least one water usage product that is a bathroom product.

Preferably, the bathroom product comprises a faucet, a toilet, a urinal, a shower, a bath, and/or a bidet.

Preferably, the set of water usage products are arranged in a defined area to provide water services to the defined area Preferably, the operational status is an indication that a first water usage product was operated recently, and wherein the alteration is an increase in water flow to a second water usage product that is known to be operated subsequent to operation of the first water usage product.

BRIEF DESCRIPTION OF DRAWINGS

Preferred embodiments of the present invention will now be described, by way of example only, with reference to the accompanying drawings.

DESCRIPTION OF EMBODIMENTS

The water flow management system 1 and/or the method for managing water flow may be implemented in dedicated hardware such as one or more integrated circuits performing the functions or sub functions of water management. Such dedicated hardware may include graphic processors, digital signal processors, or one or more microprocessors and associated memories.

Figure 1A:
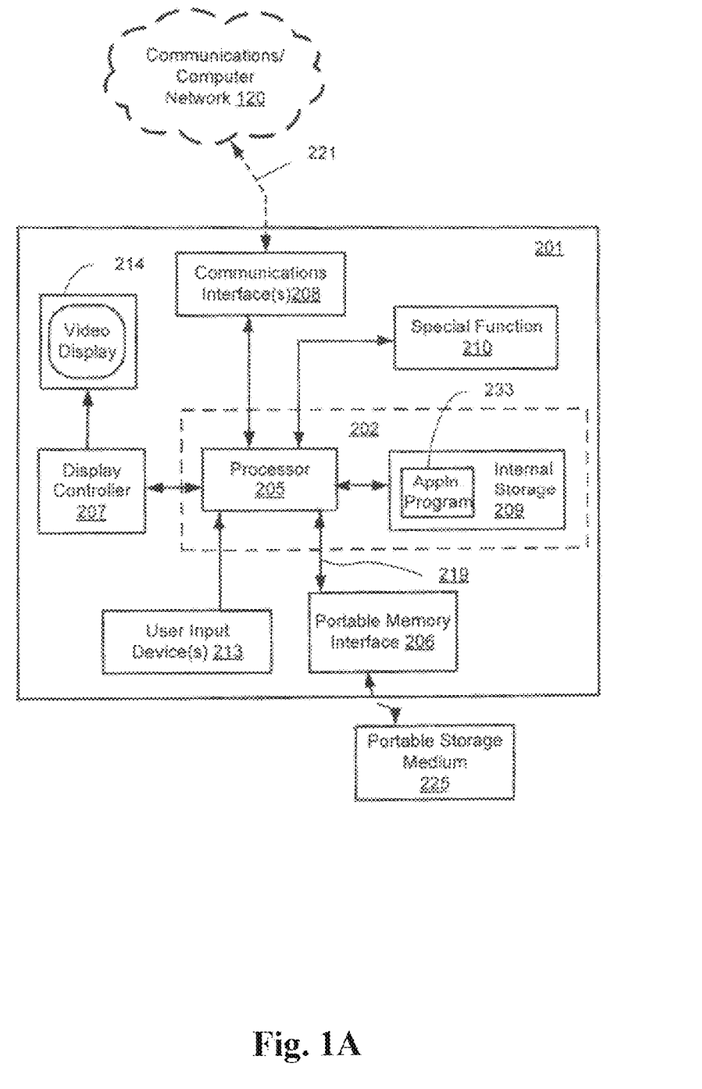
FIGS. 1A and 1B collectively form a schematic block diagram representation of an embedded electronic device upon which described arrangements can be practice.
Figure 1B:
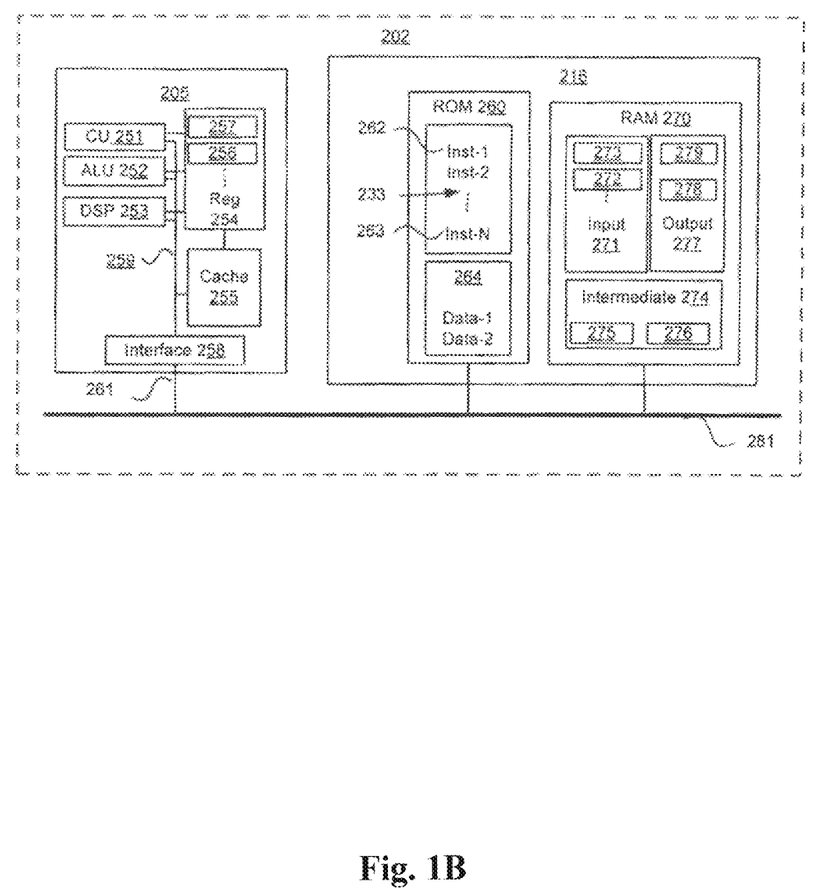

FIGS. 1A and 1B collectively form a schematic block diagram of a general purpose electronic device 201 including embedded components, upon which the water flow management system and/or the method for managing water flow to be described are desirably practiced. The embedded electronic device 201 may be, for example, a mobile phone, a tablet device, a smart watch, personal digital assistant type device or any other embedded electronic device, in which processing resources are limited. Nevertheless, the system and/or methods to be described may also be performed on higher-level devices such as desktop computers, server computers, and other such devices with significantly larger processing resources.

As seen in FIG. 1A, the electronic device 201 comprises an embedded controller 202. Accordingly, the electronic device 201 may be referred to as an "embedded device." In the present example, the controller 202 has a processing unit (or processor) 205 which is bi-directionally coupled to an internal storage module 209. The storage module 209 may be formed from non-volatile semiconductor read only memory (ROM) 260 and semiconductor random access memory (RAM) 270, as seen in FIG. 1B. The RAM 270 may be volatile, non-volatile or a combination of volatile and non-volatile memory.

The electronic device 201 includes a display controller 207, which is connected to a video display 214, such as a liquid crystal display (LCD) panel or the like. The display controller 207 is configured for displaying graphical images on the video display 214 in accordance with instructions received from the embedded controller 202, to which the display controller 207 is connected.

The electronic device 201 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the electronic device 201 also comprises a portable memory interface 206, which is coupled to the processor 205 via a connection 219. The portable memory interface 206 allows a complementary portable memory device 225 to be coupled to the electronic device 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 201 also has a communications interface 208 to permit coupling of the device 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 201 is configured to perform some special function. The embedded controller 202, possibly in conjunction with further special function components 210, is provided to perform that special function. For example, where the device 201 is a digital camera, the components 210 may represent a lens, focus control and image sensor of the camera. The special function components 210 are connected to the embedded controller 202. As another example, the device 201 may be a mobile telephone handset. In this instance, the components 210 may represent those components required for communications in a cellular telephone environment. Where the device 201 is a portable device, the special function components 210 may represent a number of encoders and decoders of a type including Joint Photographic Experts Group (JPEG), (Moving Picture Experts Group) MPEG, MPEG-1 Audio Layer 3 (MP3), and the like.

Various systems and/or methods described hereinafter may be implemented using the embedded controller 202, where the process of FIG. 3 may be implemented as one or more software application programs 233 executable within the embedded controller 202. The electronic device 201 of FIG. 1A implements the described systems and/or methods. In particular, with reference to FIG. 1B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the electronic device 201. However, in some instances, the application programs 233 may be supplied to the user encoded on one or more CD-ROM (not shown) and read via the portable memory interface 206 of FIG. 1A prior to storage in the internal storage module 209 or in the portable memory 225. In another alternative, the software application program 233 may be read by the processor 205 from the network 220, or loaded into the controller 202 or the portable storage medium 225 from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 233 and the corresponding code modules mentioned above may be executed to implement one or more graphical user interfaces (GUIs) to be rendered or otherwise represented upon the display 214 of FIG. 1A. Through manipulation of the user input device 213 (e.g., the keypad), a user of the device 201 and the application programs 233 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the electronic device 201 is initially powered up, a system program resident in the ROM 260 is executed. The application program 233 permanently stored in the ROM 260 is sometimes referred to as "firmware". Execution of the firmware by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processor (DSP) 2153 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 through 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the electronic device 201. Typically, the application program 233 waits for events and subsequently executes the block of code associated with that event. Events may be triggered in response to input from a user, via the user input devices 213 of FIG. 1A, as detected by the processor 205. Events may also be triggered in response to other sensors and interfaces in the electronic device 201.

The execution of a set of the instructions may require numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the electronic device 201.

Figure 2:
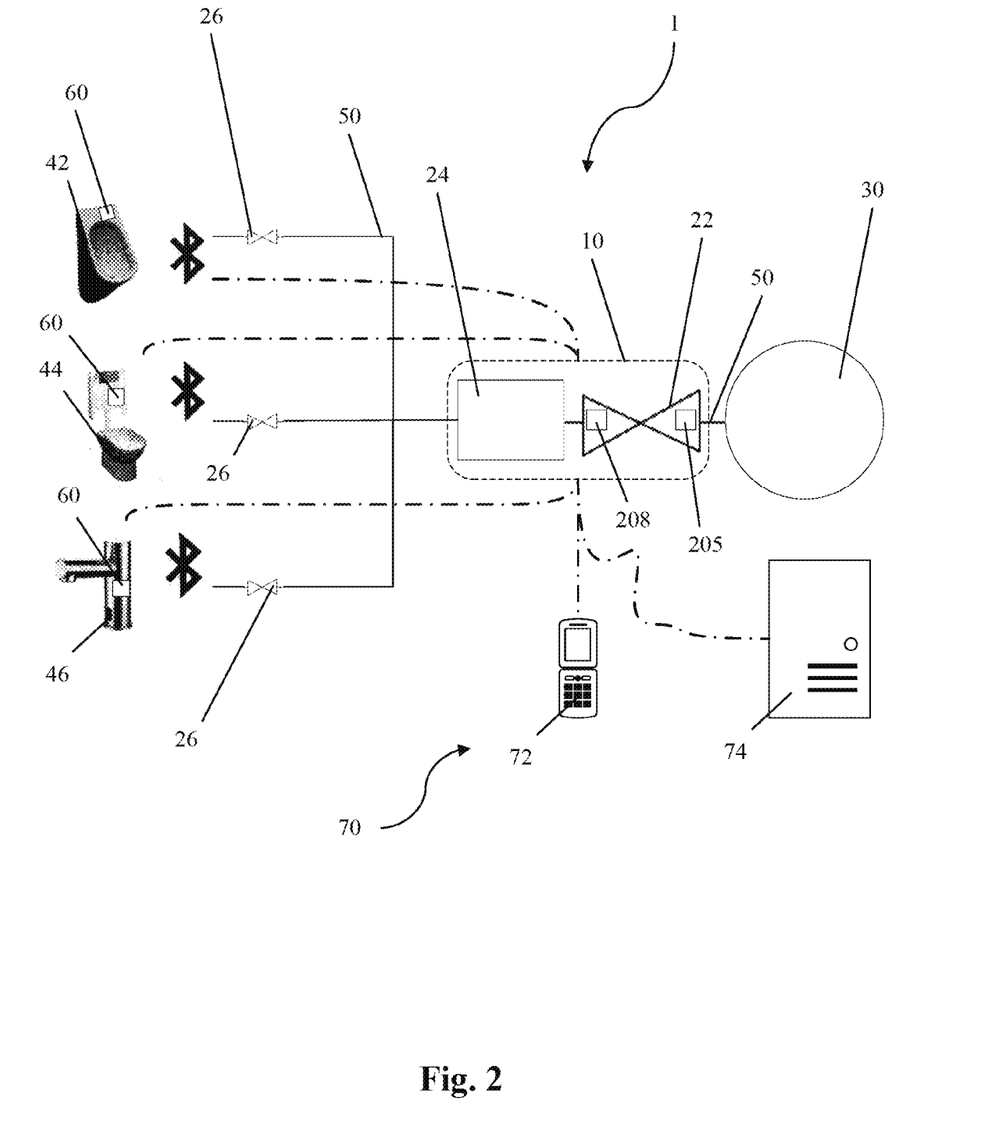
FIG. 2 is a schematic block diagram of an embodiment of the water flow management system according to the present invention in use with a set of water usage products.

As shown in FIG. 2, the preferred embodiment of a water flow management system 1 includes a valve assembly 10 that is interposed between a water source 30 and a number of water usage products 40. The valve assembly 10 comprises a valve 22 and a water flow detector 24. In this embodiment the valve 22 and the water flow detector 24 are integrated in a valve assembly 10. However, it will be appreciated that the water flow detector 24 and the valve 22 may be separate parts. It is further possible that multiple valves 22 and/or multiple water flow detectors 24 operate together.

The valve assembly 10 further includes the general purpose electronic device 201, comprising the processor 205. The water flow detector 24 is adapted to communicate an operational state, more specifically, a water flow rate, to the communications interface 208. In the preferred embodiment, the water flow detector 24 is a water flow smart meter.

In the example shown in FIG. 2, the water usage products 40 are a urinal 42, a toilet 44, and a faucet 46. The water usage products 40 receive a supply of water from the water source 30 through a network of plumbing 50. Each water usage product 40 may have a second valve 26. The supply of water from the water source 30 passes through the valve assembly 10, and also passes through the second valve 26.

It will be appreciated that in the example shown in FIG. 2, the water usage products 40 are arranged in a defined area, such as a bathroom, to provide water services to the defined area. However, in larger buildings, multiple defined areas may exist, or the defined area may be significantly larger. In these cases, it may be necessary to operate multiple valves 22 and/or multiple water flow detectors 24.

In the case of multiple defined areas, a single valve 22 may control the flow of water from the water source 30 to the water usage products 40 located in each defined area. Each valve 22 is associated with one or more water flow detectors 24.

In the case of a large defined area, such as a floor of a building have a plurality of bathrooms, it may be necessary to operate multiple valves 22 for the water usage products 40 in the defined area, instead of a single valve 22 for the defined area. Each valve 22 is then associated with one or more water flow detectors 24.

The water usage products 40 are equipped with electronic controllers 60, which are adapted to detect an operational parameter of the water usage products 40. The operational parameter may include, dependent on the type of water usage product, a water flow rate, a water temperature, an in-use indicator, a usage frequency, a usage counter, a time since last use, and other like parameters that are of interest in controlling and maintaining the performance of the water usage products 40.

The electronic controllers 60 are adapted to communicate with the communications interface 208. The communications interface 208 then allows the processor 205 to access the information transmitted from the electronic controllers 60. In the preferred embodiment, this communication occurs via Bluetooth™. However, it would be understood that other means of communication would be possible, such as, for example, Wireless LAN, Wired LAN, or radio frequency (RF) communications. The communications interface 208 also allows the processor 205 to communicate with a user device 70, such as a personal handheld device 72, or a server 74.

Use of the water management system 1 will now be discussed.

Figure 3:
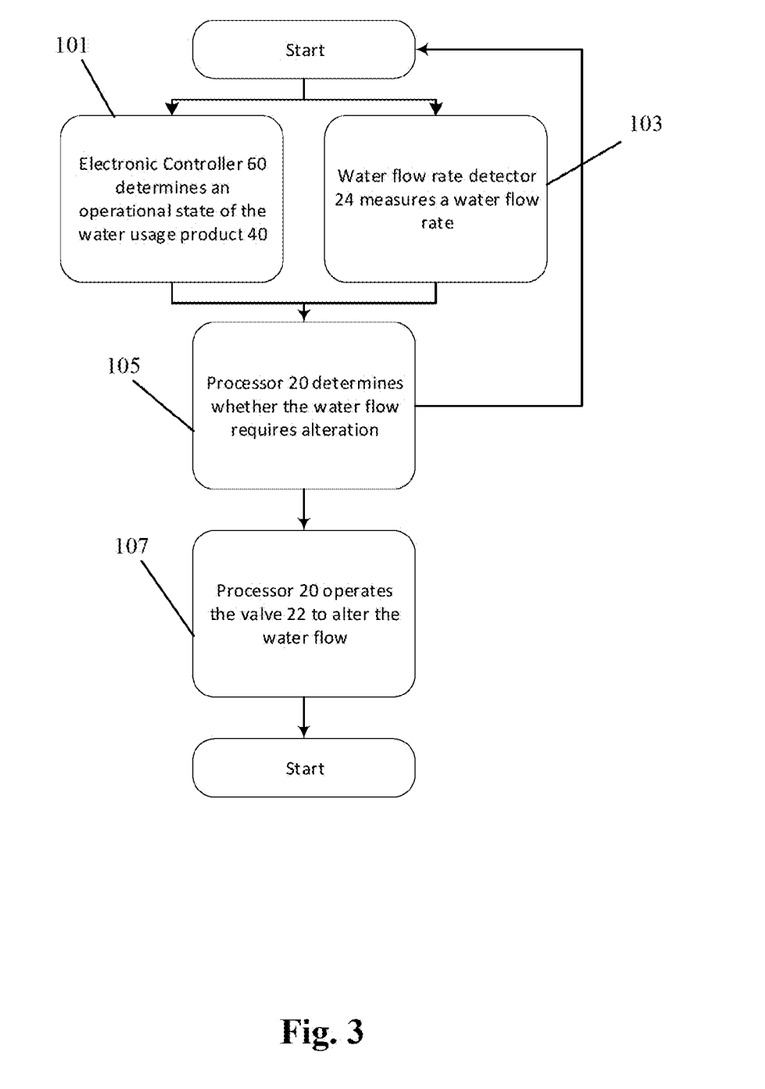
FIG. 3 is a schematic flow chart of operation of the water flow management system of FIG. 2.

As shown in FIG. 3, the water management system 1 may be used to detect a water leak. To do so, the electronic controllers 60, at step 101, measure the operational parameter of the water usage products 40. Similarly, at step 103, the water flow detector 24 measures the water flow rate through the water flow detector 24. Both the water flow detector 24 and the electronic controllers 60 communicate the water flow rate and the operational parameter to the communications interface 208 of the processor 205.

The processor 205, at step 105, performs a determination on the basis of the information communicated to the processor 205. If the water flow rate that the water flow detector 24 has communicated to the processor 205 indicates that water is flowing to the water usage products 40, and the operational parameters the electronic controllers 60 have communicated to the processor 205 indicate that no water usage product 40 is using water, the processor 205 determines a leak is occurring and, at step 107, operates the valve 22 to prevent further supply of water from the water source 30 to the water usage products 40. If the processor 205 determines that the leak is occurring at a particular water usage product 40, the processor 205 operates the second valve 26 associated with the water usage product 40 to prevent further supply of water to the water usage product 40.

The processor 205 then outputs an alarm signal, using the communications interface 208, to the user device 70, i.e. the personal handheld device 72 and/or the server 74.

The water flow management system 1 may also be used to determine and rectify an insufficient water flow rate to a water usage product 40. To do so, the electronic controller 60 of a water usage product 40 measures a water flow rate at the water usage product 40, and communicates the water flow rate of the water usage product 40 to the processor 205. If the water flow rate of the water usage product 40 is below a predetermined minimum flow rate, the processor 205 operates the valve 22 and/or one or more of the second valves 26 to increase the water flow rate and/or water pressure to the water usage product 40. If the processor 205 is unable to increase the water flow rate and/or water pressure to the water usage product 40, the processor 205 then outputs an alarm signal, using the communications interface 208, to the user device 70.

Similarly, the water flow management system 1 may be used to determine and rectify an excessive water flow rate through a water usage product 40. To do so, the electronic controller 60 of a water usage product 40 measures a water flow rate of the water usage product 40, and communicates the water flow rate of the water usage product 40 to the processor 205. If the water flow rate of the water usage product 40 is above a predetermined maximum flow rate, the processor 205 operates the valve 22 and/or one or more of the second valves 26 to decrease the water flow rate and/or water pressure to the water usage product 40. If the processor 205 is unable to decrease the water flow rate and/or water pressure to the water usage product 40, the processor 205 then outputs an alarm signal, using the communication interface 208, to the user device 70.

Further, the water flow management product 1 may be used to confirm that a water usage product 40 is operating correctly. To do so, the valve assembly 10 may provide a range of different water flow rates and/or pressures to the water usage product 40. The electronic controller 60 measures one or more operational parameters of the water usage product 40 in response to the different water flow rates and/or pressures. The electronic controller 60 and the water flow detector 24 communicate, respectively, the operational parameter and the water flow rate to the processor 205. The processor 205 then determines whether the performance of the water usage product 40, as determined by inspection of the operational parameter data in response to the water flow rate, is within predetermined acceptable bounds. The processor 205 then communicates, using communications interface 208, with the user device 70 to confirm that the water usage product 40 has been correctly installed.

The water flow management system 1 may also perform the diagnostic steps described above in relation to determining correct operation on a regular basis to assess the status of the water usage products 40.

Finally, the water flow management system 1 may be used to regulate the water flow and/or water pressure to a water usage product 40 in response to an operational parameter measured on a different water usage product 40. For example, operation of the toilet 44 is generally followed by operation of the faucet 46. The electronic controller 60 of the toilet 44 determines that the toilet 44 has been operated and communicates the operational parameter to the processor 205. The processor 205 then operates the valve 22 and/or the second valves 26 of other water usage products 40 to provide additional or sufficient water flow and/or water pressure to the faucet 46.

Advantages of the water flow management system 1 will now be discussed.

The water flow management system 1 is able to quickly respond to leaks occurring in the defined area serviced by each valve assembly 10 by controlling water flow based on locally received signals and sending local control signals. Instead of communicating the operational parameters to a building management system, determining a leak is occurring at the building management system, and sending a control action back to the valve 22 to interrupt the flow of water from the water source 30, the valve assembly 10 is able to quickly stop the flow of water. In the case of large leaks, a delay of a few seconds can cause large amounts of structural and economic damage. Thus, the reduction in time in which the electronic controllers 60 and the water flow detector 24 communicate, and the ability to almost instantly stop the flow of water once a leak has been detected, is advantageous in comparison to a building management system.

The water flow management system 1 is also able to act on the information communicated by the electronic controllers 60 on a product-by-product basis, using second valves 26. Thus, leaks occurring in a single water usage product 40 may be responded to without impacting the performance of other water usage products 40 in the same location.

The water flow management system 1 is integrated into the building management system by outputting the alarm signal to the user device. However, instead of communicating an error state, the water flow management system 1 is able to report that a water leak has occurred, and has been stopped. This means that further action is not urgent, and disruption to maintenance schedules can be minimised.

The water flow management system 1 is able to determine and rectify a water flow rate to a water usage product 40 that would be detrimental to the water usage product 40 or a user. For example, if the electronic controller 60 of the urinal 42 measures a water flow rate below the predetermined minimum water flow rate, the valve assembly 10 is able to increase the water flow rate and/or pressure to avoid the formation and/or build-up of urine salts. For example, the processor 205 may operate the second valves 26 associated with water usage products 40 that are not urinals 42, thereby increasing the available water flow rate to the urinal 42 whose second valve 26 has not been operated.

The water flow management system 1 is also able to precisely control the water flow rate to a water usage product 40 that is subject to water use regulations. This avoids the use of individual water flow rate restrictor devices.

The water flow management system 1 is also able to confirm, shortly after installation, that a water usage product 40 has been installed correctly. This avoids the unnecessary travel to and from an installation site if installation errors are only recognised during later use of the water usage product 40. Regular diagnostic tests of the water usage product 40 may also be provided by the water flow management system 1, which assists in maintaining an accurate record of the performance and maintenance requirement of the water usage product 40.

The water flow management system 1 is thus able to identify unintended water flow to the water usage products 40, by accessing the data provided by the electronic controllers 60. This provides the ability to make a deterministic decision as to whether an alteration of the water flow is required, rather than arbitrarily defining "normal" and "abnormal" water usage patterns, without determining the operational state of the water usage product 40. This leads to a reduction in undesired shutoffs by the water flow management system 1, which entail maintenance costs and poor user experience, and a better detection of undesirable water flow states by the water flow management system 1, such as a water leak.

Although the invention has been described with reference to specific examples, it will be appreciated by those skilled in the art that the invention may be embodied in many other forms.

The invention claimed is:

1. A water flow management system including a valve, the valve being adapted to communicate with at least one water flow detector and a set of water usage products comprising a urinal with an associated urinal water flow detector and urinal valve adapted to control water flow to the urinal, wherein the water flow detector detects water flow to the set of water usage products, wherein the valve includes a processor that is arranged to determine:
   an operational status of the set of water usage products, a water flow status of the water flow detector, and whether, on the basis of the operational status and the water flow status, the water flow to the set of water usage products requires alteration,
   wherein the operational status includes determining that a water flow rate to the urinal is less than a predetermined minimal flow rate based on the water flow rate measured by the urinal water flow detector,
   wherein the alteration includes increasing the water flow rate and/or pressure to the urinal by operating at least one second valve adapted to supply water to a respective one of the water usage products other than the urinal without operating the urinal water flow valve, and
   wherein the processor is adapted to operate the at least one second valve to effect the required alteration.

2. The water flow management system of claim 1, wherein the processor is further adapted to operate the at least one second valve to effect the required alteration, the at least one second valve controlling water flow to one of the set of water usage products.

3. The water flow management system of claim 1, wherein the water flow is stopped in response to a water leak occurring, wherein the processor determines whether the water leak is occurring, based upon a determination that the water flow status indicates a water flow through the water flow detector and the operational status indicates that water is not currently being used by the set of water usage products.

4. The water flow management system of claim 1, wherein the alteration includes an increase in the pressure of the water flow to the set of water usage products.

5. The water flow management system of claim 1, wherein the alteration includes a decrease in the pressure of the water flow to the set of water usage products.

6. The water flow management system of claim 1, wherein the alteration includes a control of the water flow to the set of water usage products to a predetermined water flow rate.

7. The water flow management system of claim 6, wherein the predetermined water flow rate includes a minimum flow rate to a urinal.

8. The water flow management system of claim 1, wherein the valve includes:
a communication module adapted to communicate with the processor, the water usage products, and a user device;
such that the processor is able to send a performance signal based on a performance of the set of water usage products to the user device.

9. The water flow management system of claim 8, wherein the performance signal includes an alarm signal based on the operational status and the water flow status.

10. The water flow management system of claim 8, wherein the performance signal includes a confirmation that a water usage product is operating correctly.

11. The water flow management system of claim 1, wherein the water flow detector and the valve are integrated into a single component.

12. The water flow management system of claim 1, wherein the water flow detector includes a water flow smart meter.

13. The water flow management system of claim 1, wherein the set of water usage products comprises at least one water usage product in addition to the urinal that is a bathroom product.

14. The water flow management system of claim 13, wherein the bathroom product is selected from a group consisting of a faucet, a toilet, a urinal, a shower, a bath, and a bidet.

15. The water flow management system of claim 14, wherein the at least one water usage product in addition to the urinal is a shower, and wherein the predetermined water flow rate includes a maximum flow rate to a shower.

16. The water flow management system of claim 1, wherein the set of water usage products are arranged in a defined area to provide water services to the defined area.

17. A method for managing water flow to a set of water usage products comprising a urinal with an associated urinal water flow detector and urinal valve adapted to control water flow to the urinal, the method comprising:
determining a water flow status to the set of water usage products using a water flow detector;
determining an operational status of the set of water usage products using information from electronic controllers associated with respective water usage products in the set of water usage products,
wherein the operational status includes determining that a water flow rate to the urinal is less than a predetermined minimal flow rate based on the water flow rate measured by the urinal water flow detector,
determining, on the basis of the operational status and the water flow status, whether the water flow to the set of water usage products requires alteration;
wherein the alteration includes increasing the water flow rate and/or pressure to the urinal by operating at least one second valve adapted to supply water to a respective one of the water usage products other than the urinal without operating the urinal water flow valve, and
operating the at least one second valve to effect the alteration.

18. The method of claim 17, wherein the method further comprises:
determining whether a water leak is occurring, based upon a determination that the water flow status indicates a water flow through the water flow detector and the operational status indicates that water is not currently being used by the set of water usage products; and
wherein the water flow is stopped in response to the water leak occurring.

19. The method of claim 17, wherein the alteration includes an increase in the pressure of the water flow to the set of water usage products.

20. The method of claim 17, wherein the alteration includes a decrease in the pressure of the water flow to the set of water usage products.

21. The method of claim 17, wherein the alteration includes a control of the water flow to the set of water usage products to a predetermined water flow rate.

22. The method of claim 21, wherein the predetermined water flow rate includes a minimum flow rate to a urinal.

23. The method of claim 17, wherein the method further comprises:
sending a performance signal based on a performance of the set of water usage products to a user device.

24. The method of claim 23, wherein the performance signal includes an alarm signal based on the operational status and the water flow status.

25. The method of claim 23, wherein the performance signal includes a confirmation that a water usage product is operating correctly.

26. The method of claim 17, wherein the set of water usage products comprises at least one water usage product in addition to the urinal that is a bathroom product.

27. The method of claim 26, wherein the bathroom product is selected from a group consisting of a faucet, a toilet, a urinal, a shower, a bath, and a bidet.

28. The method of claim 27, wherein the at least one water usage product in addition to the urinal is a shower, and wherein the predetermined water flow rate includes a maximum flow rate to a shower.

* * * * *